(12) United States Patent
Kroh

(10) Patent No.: US 7,947,641 B2
(45) Date of Patent: May 24, 2011

(54) AGENT FOR TREATING OIL-POLLUTED GROUND, AND FOR CLEANING OIL-CONTAMINATED SURFACES AND CONTAINERS

(75) Inventor: Werner Kroh, Enggistein (CH)

(73) Assignee: Swisstech Holding AG, Zug (CH)

( * ) Notice: Subject to any disclaimer, the term of this patent is extended or adjusted under 35 U.S.C. 154(b) by 231 days.

(21) Appl. No.: 12/092,949

(22) PCT Filed: Nov. 1, 2006

(86) PCT No.: PCT/CH2006/000613
§ 371 (c)(1),
(2), (4) Date: Aug. 15, 2008

(87) PCT Pub. No.: WO2007/051337
PCT Pub. Date: May 10, 2007

(65) Prior Publication Data
US 2008/0312122 A1    Dec. 18, 2008

(30) Foreign Application Priority Data

Nov. 7, 2005  (CH) .......................... 1779/05
Nov. 8, 2005  (WO) ............... PCT/CH2005/000658
Sep. 15, 2006 (CH) .......................... 1473/06
Sep. 15, 2006 (CH) .......................... 1474/06

(51) Int. Cl.
*C11D 3/20*   (2006.01)

(52) U.S. Cl. ........ 510/365; 510/188; 510/417; 510/418; 510/437; 507/103; 507/138; 507/203; 507/265; 210/634; 210/660; 210/671; 210/690; 134/40; 134/42

(58) Field of Classification Search ................. 510/365, 510/188, 417, 418, 437; 507/103, 138, 140, 507/203, 261, 265, 269; 210/634, 660, 671, 210/679, 680, 690, 693; 134/40, 42
See application file for complete search history.

(56) References Cited

U.S. PATENT DOCUMENTS

| | | | | | |
|---|---|---|---|---|---|
| 1,707,031 | A | * | 3/1929 | Stuart | 510/418 |
| 4,202,766 | A | * | 5/1980 | Ono et al. | 210/691 |
| 5,688,843 | A | * | 11/1997 | Inaoka et al. | 523/216 |
| 5,723,423 | A | * | 3/1998 | Van Slyke | 510/188 |
| 5,833,756 | A |   | 11/1998 | Haegel et al. | |
| 6,063,281 | A | * | 5/2000 | Bonkhoff et al. | 210/638 |
| 6,280,533 | B1 | * | 8/2001 | Hoppe et al. | 134/26 |
| 6,544,530 | B1 | * | 4/2003 | Friedman | 424/400 |
| 2002/0098997 | A1 | * | 7/2002 | Audibert-Hayet et al. | 510/417 |
| 2002/0187545 | A1 |   | 12/2002 | Calcavecchio et al. | |
| 2003/0205525 | A1 | * | 11/2003 | Severin | 210/634 |
| 2009/0120872 | A1 | * | 5/2009 | Kroh | 210/631 |

FOREIGN PATENT DOCUMENTS

DE   197 16 953 A1   10/1998
WO   01/76782 A3   10/2001

OTHER PUBLICATIONS

Grohs, Ing. H., "Preparation of Contaminated Soil," Aufbereitungs-Technik, vol. 31, No. 12, pp. 656-662, (Dec. 1990) Wiesbaden, Germany.

* cited by examiner

*Primary Examiner* — Mark Eashoo
*Assistant Examiner* — Jane L Stanley
(74) *Attorney, Agent, or Firm* — Janet Sleath; Speckman Law Group PLLC

(57) ABSTRACT

The invention relates to a concentrate for the effective, environmentally friendly treatment of oil-polluted stretches of ground and the cleaning of oil-contaminated surfaces, said concentrate containing an emulsifier, a vegetable oil and ethanol. The emulsifier is preferably a non-ionic surfactant with an HLB value between 7 and 8. The vegetable oil is preferably selected so that it is liquid at temperatures above 5 DEG C. Oils containing unsaturated fatty acids, in particular germ oils are especially suitable. For its application as a treatment for stretches of ground, the inventive concentrate is diluted with water to form a cleaning solution and is applied to the oil-contaminated surface that is to be treated. The oil is emulsified in the inventive cleaning solution and is detached from the particles of the ground. The oil degrades in a significantly easier manner in the emulsified state. To clean oil-contaminated surfaces, the cleaning solution is sprayed onto the latter. In an advantageous embodiment of the inventive cleaning method, a powder-like adsorption agent is added to the oil emulsion that is formed during the cleaning of oil-tank interiors, said agent adsorbing the emulsified oil and forming a sediment with the latter.

20 Claims, No Drawings

AGENT FOR TREATING OIL-POLLUTED GROUND, AND FOR CLEANING OIL-CONTAMINATED SURFACES AND CONTAINERS

REFERENCE TO RELATED APPLICATIONS

This application is the U.S. national phase entry of International Patent Application No. PCT/CH2006/000613 filed 1 Nov. 2006, which claims priority to Swiss Patent Application No. 01779/05 filed 7 Nov. 2005.

FIELD OF THE INVENTION

The invention relates to a concentrate for manufacturing a cleaning solution for treating oil-contaminated soil and for cleaning surfaces contaminated with oil, to a cleaning solution manufactured from the concentrate, to a method for treating oil-contaminated soil with a cleaning solution, as well as to a method for cleaning oil-contaminated surfaces with the cleaning solution.

BACKGROUND OF THE INVENTION

With the transport of mineral oils, in particular crude oil, grave pollution of the environment occurs again and again due to oil spills and exiting oil. Such events may have larger extents, for example burst or leaking transport pipelines, but even smaller occurrences such as exiting fuel after accidents are problematic.

Whilst there are different tried and tested methods for removing oil contamination from the surface of water, for example oil binding agent capable of floating, the cleaning of oil-contaminated soil is very difficult. A mechanical removal of the contaminated ground and its subsequent disposal is very costly and requires a lot of effort, even for very small amounts of contamination, and is financially and logistically impossible with greater amounts.

The cleaning of oil-contaminated surfaces is likewise problematic, for example on oil-contaminated rocky coasts and beaches, but also in the inside of oil tanks. A removal of the oil residues with water, e.g. with a high-pressure cleaner, may lead to the contamination being simply conveyed to a different location. A mechanical cleaning of surfaces on the other hand requires much effort. It is regrettably still a widespread practice to flush such fuel and transport tanks of ocean-going ships with seawater for cleaning, and to simply dispose of the arising oil residues in the sea.

DESCRIPTION OF THE INVENTION

It is the object of the invention to provide a concentrate for manufacturing a cleaning solution, and a cleaning solution, which permit an efficient treatment of oil-contaminated ground which is nevertheless as friendly as possible to the environment, and an efficient cleaning of oil-contaminated surfaces, which is nevertheless as friendly as possible to the environment. It is likewise an object of the invention to provide new and advantageous methods for treating oil-contaminated ground and cleaning oil-contaminated surfaces, which does not have the disadvantages of the known methods.

These and other objects are achieved by a concentrate according to the invention, a cleaning solution manufactured of a concentrate according to the invention, as well as a method according to the invention, according to the independent claims. Further preferred embodiments are specified in the dependent claims.

An inventive concentrate for treating oil-contaminated soil and for cleaning oil-contaminated surfaces consists of an emulsifier, an oil of plant origin (hereinafter referred to as vegetable oil) and a solubilizer. The emulsifier is advantageously a non-ionic tenside with an HLB-value between 7 and 8. The vegetable oil is advantageously selected such that it is fluid at temperatures from above 5° C., preferably from 10° C. Oils with an increased content of unsaturated fatty acids are particularly suitable. The solubilizer is advantageously ethanol or isopropanol, but other low-molecular alcohols or glycol ether may also be used. A concentrate according to the invention is homogenous, clear and free of water. It has a long shelf life and may be transported and stored without any danger. For storage and transport, the concentrate according to the invention is preferably formulated with double the quantity of water into a pre-solution.

For application for the treatment of fixed objects such as rocks, cliffs or infrastructure such as walls, sidings or dams, an inventive concentrate or a pre-solution is diluted with water into a ready-to-use cleaning solution, and deposited onto the oil-contaminated surfaces to be treated, preferably sprayed on, or the surfaces are washed with the cleaning solution. The contaminating oil is emulsified in the cleaning solution according to the invention, and thus detached from the surfaces. In the emulsified, finely distributed condition, the oil may be biologically and also chemically degraded much more easily. In the deeper-lying ground layers, the finely dispersed oil bonds to the present ground mineral particles, where it is present in an adsorbed manner and is later degraded. The oil does not therefore get into the groundwater. The presence of a vegetable oil furthermore offers the microorganisms breaking down the oil an advantageous nutrient substrate. Since the oil residues may be broken down on location, an expensive disposal of the contaminated soil is no longer necessary.

It is even possible to manufacture the cleaning solution during the application, for example by way of continuously admixing the concentrate according to the invention, or the pre-solution, to water, for example in a high-pressure cleaner.

A concentrate according to the invention is particularly suitable for cleaning oil-contaminated stones on beaches, where a mechanical cleaning is not practical, and a mere removal of the oil residues with water would only lead to it being carried into the earth or into the water. A use of a cleaning solution manufactured by way of the concentrate according to the invention, for cleaning oil tanks, in particular on ocean-going ships, is likewise advantageous.

In a particularly advantageous variant of a cleaning method according to the invention, a powder-like adsorbing agent is added to the emulsion of oil and cleaning solution, which occurs on cleaning the inner walls of the tank with a cleaning solution according to the invention, and this adsorbing agent absorbs the emulsified oil. The characteristics of the adsorbing agent thereby is selected such that the specific density of the adsorbing agent is larger than that of water, so that the bonded oil sediments with the adsorbing agent. The powder particles bind the oil particles by way of adsorption, in that they arrange themselves around the oil droplet. The parts of the oil-powder complex sink completely to the bottom of the respective container or water due to the higher specific weight of the powder according to the invention, which is preferably between 2.5 and 3.5, particularly preferably around 3.0. The present invention uses physisorption, a special form of adsorption, with which the sorbat is bonded to the sorbent by way of physical forces and not by the formation of chemical bondings. The physical forces acting here, as a rule, are non-directional, and have the advantage that the bondings are reversible. The sorbat may thus be set free by the sorbent again, which encourages a microbial breakdown of the oil. The adsorbing agent with a specific weight of about 2.4 to just below 3 g/cm$^3$, is a composition of different rocks or naturally occurring minerals in powder form. One essential main component of the composition according to the invention is selected from the following group: granite meal, quartz meal, meal of siliceous limestone, marble meal and mixtures thereof The grains size of the individual constituents or components of the composition according to the invention preferably lies between 80 to 600, preferably below 350 micrometers. According to preferred embodiments, more than 50% or preferably 100% of the particles lie in the size range below 350 micrometers.

After addition of the adsorbing agent and the sedimentation of the oil, the remaining solution left over practically no longer contains any oil, and may be released without any problem, either directly or diluted with water, to the environment, where the emulsifier is biologically broken down. The oil-containing sediment may be led to an in situ biodegradation, or collected and disposed of in an environmentally friendly manner.

DETAILED DESCRIPTION OF PREFERRED EMBODIMENTS

Non-ionic tensides, in particular fatty amines, polyethylene glycols or oleic acid esters of ethoxylised caster oil, for example PEG 18 castor oil dioleate, are particularly suitable as emulsifiers in a concentrate according to the invention. PEG 18 castor oil dioleate is marketed for example under the trade name MARLOWET LVS® by the company SASOL Germany GmbH, D45764 Marl, as a raw material for cosmetics, and has a specific density at room temperature of 0.9 g/cm$^3$. A primary alkylamine such as for example 1-aminododecane, as is offered by the company Akzo under the name ARMEEN-12D®, may be used as a fatty amine. The emulsifier may also be a mixture of several suitable substances.

Preferably the emulsifier has an HLB-value between 7 and 8, particularly preferably an HLB-value of 7.5. The HLB-value (hydrophilic lipophilic balance) thereby indicates an empirical characteristic number, which describes the shares of hydrophilic and lipophilic groups in a molecule.

The vegetable oils used for the manufacture of a concentrate according to the invention are advantageously fluid at common environmental temperatures. Oils with a relatively high content of unsaturated fatty acids, in particular germ oils such a wheat germ oil and maize germ oil, are particularly suitable.

Common to all applied substances is the fact that they are preferably as safe as possible with regard to toxicology, and are rapidly biologically degradable.

A few exemplary formulations of concentrates according to the invention, and the respective cleaning solutions, are explained hereinafter.

A. APPLICATION EXAMPLE 1

A Concentrate 1 according to a first embodiment of the invention consists of
12.5% by volume of PEG 18 caster oil dioleate
12.5% by volume of maize germ oil and
75% by volume of ethanol
In an alternative advantageous formulation, the Concentrate 1 may also comprise isopropanol instead of ethanol:
12.5% by volume of PEG 18 caster oil dioleate
12.5% by volume of maize germ oil and
75% by volume of isopropanol The Concentrate 1 may be used for manufacturing a pre-solution 1 which has likewise been proven to be suitable for storage and transport. 320 liters ml of concentrate 1 (consisting of 40 ml of PEG 18 caster oil dioleate, 40 ml of maize germ oil and 240 ml of ethanol or isopropanol) was emulsified with 680 ml of water for manufacturing one liter of pre-solution 1.

This pre-solution is preferably diluted 150-fold to 250-fold by water, preferably 200-fold, into a ready-to-use cleaning solution 1 for the treatment of oil-contaminated soil, and this cleaning solution is deposited onto the soil to be treated, or is sprayed onto the surface to be treated.

For treating the soil or for treating a surface, the concentrate or pre-solution is diluted with water for the cleaning solution ready for application, and is deposited onto the soil to be treated, or is sprayed onto the surface to be treated. Preferably, 0.24 to 0.25 liters of concentrate 1 or 0.75 liters of the pre-solution 1 per kilogram of present crude oil/refined oil (typical specific gravity<0.85 g/cm$^3$) is diluted with water into 150 liters of cleaning solution 1.

For heavy oil (typical specific gravity>0.85 g/cm$^3$), which is significantly more viscous, the quantity of the concentrate according to the invention must be increased by 20 to 70%, as the case may be. Advantageously 0.3 liters of concentrate or 1 liter of pre-solution 1 is diluted with water into 150 liters of cleaning solution. The quantity of cleaning solution per kilogram of oil may be increased to 200 liters, as the case may be.

Therefore, for one square meter of ground, which for example is contaminated with 3 kg of crude oil with a specific gravity>0.85 g/cm$^3$, one requires for example 450 liters of cleaning solution 1, containing 0.72 liters of the concentrate 1 or 2.25 liters of the pre-solution 1.

B. APPLICATION EXAMPLE 2

A further concentrate 2 according to the invention contains:
17% by volume of PEG 18 castor oil dioleate,
17% by volume of maize germ oil and
66% by volume of ethanol.
Alternatively, the Concentrate 2 may again be formulated with isopropanol instead of ethanol:
17% by volume of PEG 18 castor oil dioleate
17% by volume of maize germ oil and
66% by volume of isopropanol.

This Concentrate 2, before application may again be diluted with approximately double the volume of water into a pre-solution 2. In order to manufacture one liter of pre-solution 2, 320 ml of concentrate 2 is mixed with 680 ml of water. The pre-solution 2 is again diluted with 150-fold to 250-fold the quantity of water, preferably 200-fold, into a ready-to-use cleaning solution 2, before the treatment. This cleaning solution is deposited onto the fixed objects, harbor structures, walls, rocks and/or cliffs which are to be treated, or is sprayed onto the surface to be cleaned.

Typically 160 ml of the concentrate 2 is diluted with water into 150 liters of cleaning solution 2 per kilogram of present crude oil/refined oil (typical specific gravity<0.85 g/cm$^3$) for cleaning a surface.

Preferably fresh water and not salt water is used for diluting the concentrates and pre-solutions according to the invention.

C. APPLICATION EXAMPLE 3

For cleaning a tank of 2.5 m$^3$, to whose inner walls adhere 6 kg of crude oil, 900 liters of cleaning solution 2, containing 3 liters of pre-solution 2, or 0.96 liters of concentrate 2, are required. The emulsion of crude oil and cleaning solution 2 is subsequently pumped over into a separate tank, and between 36 and 60 kg, preferably 48 kg of an adsorbing agent, which will be dealt with in more detail later, are added.

This adsorbing agent bonds the emulsified oil and makes it sink. The remaining residual solution, which practically no longer contains any oil, may be disposed of, directly or diluted with water.

GC-MS analyses resulted in a residual content of hydrocarbons in the left-over residual solution of less that 0.05 mg/l. This value is significantly less for example than the Swiss limit value of 10 mg/l of hydrocarbons for effluent water into still waters. Thus the effluent of the residual solution e.g. into the sea is safe.

It has been proven to be advantageous to increase the quantity of adsorbing agent by up to 120% for the treatment of contamination with heavy crude oil, in order to bond the heavy oil and to make it sink.

D. APPLICATION EXAMPLE 4

According to a further preferred embodiment of the pre-solution according to the invention, the water content is increased to 92% by volume. The pre-solution according to Example 4 comprises:
1% by volume of PEG 18 castor oil dioleate,
1% by volume of maize germ oil,
6% by volume of ethanol and
92% by volume of water.

12 liters of the pre-solution 4 are diluted on location with 138 liters of water into 150 liters of ready-to-use cleaning solution 4, and for example deposited onto a square meter of contaminated ground, which is contaminated with a kilogram of crude oil.

E. APPLICATION EXAMPLE 5

A further advantageous concentrate according to the invention consist of:
16% by volume of 1-amino-dodecane
58% by volume of polyethylene glycol and
26% by volume of glycol ether.

Concluding, it may be ascertained that the concentrates according to the invention comprise between 3 and 53% by volume, preferably 9 to 17% by volume, and particularly preferably 12.5% by volume of emulsifier, between 3 and 53% by volume, preferably 9 to 17% by volume, and particularly preferably 12.5% by volume of vegetable oil, and between 28 and 94% by volume, preferably 76% by volume of a solubilizer, wherein the sum of the individual part results in 100% in each case.

The previously described concentrates according to the invention are only to be understood as possible examples. It is possible for the man skilled in the art, without much effort, to vary and optimize the constituents of a concentrate according to the invention as well as the respective components and the dilution degree, in order to obtain further variants of concentrates according to the invention.

F. ADSORBING AGENT

The composition used in certain embodiment variants of the cleaning method according to the invention, previously called powder-like adsorbing agent, advantageously comprises particles whose size lies preferably between 80 and 600 micrometers. At least more than 50% of the composition in powder form should lie below 350 micrometers and particularly preferably 100% of the particles should lie in the range below 350 micrometers. The powder-like composition according to the invention is a dry, solid, free-flowing mixture of solids, which comprises a composition of natural mineral raw materials, which occur in the natural environment as solid matter. These raw materials are mined in primary or secondary deposits (quarries, pits or other degradation deposits of mineral raw material). They may also be extracted in recycling methods from certified, non-contaminated mineral raw materials. Preferably, the natural mineral raw materials are pre-treated or post-treated neither thermally, nor chemically.

For the manufacture of the compositions according to the invention the natural mineral raw materials are solely broken down, milled, and grinded to the necessary particle size efficiently working fro the invention. It results a total particle surface of the compositions, to which the polluting hydrocarbons, particularly crude oil, may adhesively attach in a quantitatively optimal manner (monomolecular level).

Suitable powder-like adsorbing agents are for example composed of:
40% silica sand ($SiO_2$)
40% granite meal
15% meal of siliceous limestone
5% $CaCO_3$
or
20% silica sand ($SiO_2$)
40% granite meal
20% meal of siliceous limestone
20% $CaCO_3$, preferably as marble meal
whereby in other embodiments the meal of siliceous limestone is replaced at least partially by clay, particularly brick or clinker clay.

It has been proven to be advantageous to apply about 6 to 10 kg, preferably 8 kg of the powder-like adsorbing agent per kilogram of oil to be removed. The exact composition of the adsorbing agent in powder form, and the grain size of the constituents are preferably adapted to the nature of the oil to be removed.

Free-flowing, powder-like compositions according to preferred embodiments of the present invention are disclosed in the following table, with further features and preferred ranges (in the table called bandwidths):

| raw material (stone/mineral) | chemical comp. (formula) | bandwidth of Portions (% by weight) | optimum portions (% by weight) | bandwidth of particle sizes (μm) |
|---|---|---|---|---|
| Siliceous limestone compounds: | | 5-35% | 20% (+/−2.5%) | 80-100 μm |
| quartz: | $SiO_2$ | 42% (+/−2.5%) | | |
| calcium: | $CaCO_3$ | 46% (+/−2.5%) | | |
| dolomite: | $Ca, Mg(CO_3)_2$ | 1% (+/−2.5%) | | |
| glauconite: | $(K, Na)(Fe, Al, Mg)_2(OH)_2(Si, Al)_4O_{10}$ | 1% (+/−2.5%) | | |

-continued

| raw material (stone/mineral) | chemical comp. (formula) | bandwidth of Portions (% by weight) | optimum portions (% by weight) | bandwidth of particle sizes (μm) |
|---|---|---|---|---|
| clay (montmorillonite) | (Na, Ca)(Al, Mg)$_2$Si$_4$O$_{10}$(OH)$_2$4H$_2$O | 5% (+/−2.5%) | | |
| pyrite/iron: | FeS$_2$/Fe$_2$O$_3$ | 1% (+/−2.5%) | | |
| organic compounds: | (C$_x$H$_y$)-complexes | 1% (+/−2.5%) | | |
| various minerals: | (silicates) | 3% (+/−2.5%) | | |
| Quartz compounds: | | 5-35% | 20% (+/−2.5%) | 100-160 μm |
| quartz: | SiO$_2$ | 100% | | |
| Limestone compounds: | | 5-35% | 20% (+/−2.5%) | 200-300 μm |
| calcium: | CaCO$_3$ | 100% | | |
| Granite compounds: | | 20-60% | 40% (+/−2.5%) | 150-350 μm |
| quartz: | SiO$_2$ | 35% (+/−2.5%) | | |
| K-feldspar: | K(AlSi$_3$O$_8$) | 29% (+/−2.5%) | | |
| Na-feldspar: | Na(AlSi$_3$O$_8$) | 29% (+/−2.5%) | | |
| mica: | (K, Al$_x$Mg$_y$)(F, OH)$_2$(AlSi$_3$O$_{10}$) | 4% (+/−2.5%) | | |
| hornblende: | Ca$_2$(Fe, Mg)$_4$Al(Si$_7$Al)O$_{22}$(OH, F)$_2$ | 3% (+/−2.5%) | | |

As already mentioned, the natural mineral compounds mentioned above may be partially or fully replaced by similar mineral compounds of other natural resources, or may be combined with the same natural mineral compounds of other sources.

It has been found that by particle size fractioning of the single natural mineral compounds that are used in the compositions according to the invention, and mixing these, an optimum bulk weight may be achieved, which after the adhesion process results in the sinking of the polluting crude oil in the water (salt water and fresh water).

| raw material | specific weight | bulk weight (resulting from the particle size fractioning) |
|---|---|---|
| Siliceous limestone | 2.67 | 0.90 |
| quartz | 2.65 | 0.90 |
| lime | 2.50 | 0.84 |
| granite | 2.70 | 0.91 |
| Ø | 2.64 | 0.89 |

It has been found that for the adhesion process an average specific weight of the composition according to the invention of 2.64 is advantageous.

Preferably 6 to 10 kilograms, particularly preferably 8 kilograms, of the composition according to the invention is used per 1 kilogram of crude oil contamination It is to be understood that the powder-like compositions, as the case may be, may be put together in a different ways for the respective application purpose and whilst taking into account the nature of the oil to be removed.

The invention claimed is:

1. A concentrate for manufacturing a cleaning solution for treating oil-contaminated soil and for cleaning oil-contaminated surfaces, comprising
   (i) 3-53% by volume of an emulsifier;
   (ii) 3-53% by volume of a vegetable oil; and
   (iii) 28-94% by volume of a solubilizer selected from the group consisting of: ethanol, isopropanol, glycol ether, and mixtures thereof,
wherein the sum of the individual parts results in 100% of the concentrate.

2. The concentrate according to claim 1, wherein the emulsifier is a non-ionic tenside with an HLB-value between 7 and 8.

3. The concentrate according to claim 1, wherein the emulsifier is a non-ionic tenside with an HLB-value of 7.5.

4. The concentrate according to claim 1, wherein the emulsifier is selected from a the group consisting of: fatty amines, polyethylene-glycols of ethoxylised caster oil, castor oil polyethylene-glycol dioleate, and mixtures thereof.

5. The concentrate according to claim 4, wherein the emulsifier is PEG 18 castor oil dioleate.

6. The concentrate according to claim 1, wherein the concentrate contains 9 to 17% by volume of emulsifier.

7. The concentrate according to claim 6, wherein the concentrate contains 12.5% by volume of emulsifier.

8. The concentrate according to claim 1, wherein the vegetable oil is fluid at temperatures above 5° C.

9. The concentrate according to claim 1, wherein the vegetable oil is selected from a the group consisting of: wheat germ oil, maize germ oil, and mixtures thereof.

10. The concentrate according to claim 1, wherein the concentrate contains 9 to 17% by volume of vegetable oil.

11. The concentrate according to claim 10, wherein the concentrate contains 12.5% by volume of vegetable oil.

12. The concentrate according to claim 1, wherein the concentrate comprises
   (i) 12.5% by volume of an the emulsifier;
   (ii) 12.5% by volume of a the vegetable oil, and
   (iii) 75% by volume of a the solubilizer,
wherein the sum of the individual parts results in 100% of the concentrate.

13. A cleaning solution for treating oil-contaminated soil and for cleaning oil-contaminated surfaces, comprising an aqueous solution with 0.1 to 1.5% by volume, of a concentrate according to claim 1.

14. A method for treating an oil-contaminated surfaces, wherein the surface is freed of oil by washing off with a cleaning solution according to claim 13, wherein 120 to 200 liters of the cleaning solution is used for each kilogram of oil with which the surface is contaminated.

15. The method according to claim 14 wherein consumed cleaning solution is collected, and a powder-like adsorbing agent is added to the consumed cleaning solution, to adsorb the oil emulsified in the consumed cleaning solution.

16. The method according to claim 15, wherein the powder-like adsorbing agent comprises 5-35% by weight of silica sand, 20-60% by weight of granite meal and 10-70% by weight of a component selected from the group consisting of: meal of siliceous limestone, lime, marble meal, and mixtures thereof.

17. The method according to claim 15, wherein the powder-like adsorbing agent comprises 40% by weight of silicon carbide, 40% by weight of granite meal, 15% by weight of fine-grained powder of siliceous limestone, and 5% by weight of lime.

18. The method according to claim 16, wherein the powder-like adsorbing agent comprises particles having a size of 80 to 600 micrometers.

19. A composition for cleaning oil-contaminated surfaces, consisting of a concentrate according to claim 1, and a powder-like adsorbing agent.

20. The composition according to claim 19, wherein the powder-like adsorbing agent comprises 5-35% by weight of silica sand, 20-60% by weight of granite meal and 10-70% by weight of a component selected from the group consisting of: meal of siliceous limestone, lime, marble meal, and mixtures thereof.

* * * * *